US006993897B2

(12) United States Patent
Greppi

(10) Patent No.: US 6,993,897 B2
(45) Date of Patent: Feb. 7, 2006

(54) INTERNAL COMBUSTION ENGINE OF OPEN-CLOSET CYCLE AND BINARY FLUID

(75) Inventor: Lelio Dante Greppi, Laprida 1632, Rosario, S.F., 2000 (AR)

(73) Assignee: Lelio Dante Greppi, Rosario (AR)

( * ) Notice: Subject to any disclaimer, the term of this patent is extended or adjusted under 35 U.S.C. 154(b) by 0 days.

(21) Appl. No.: 10/828,270

(22) Filed: Apr. 21, 2004

(65) Prior Publication Data

US 2004/0261759 A1 Dec. 30, 2004

Related U.S. Application Data

(60) Provisional application No. 60/482,882, filed on Jun. 27, 2003.

(51) Int. Cl.
*F02C 3/00* (2006.01)
*F02C 3/30* (2006.01)

(52) U.S. Cl. ....................................... 60/39.63; 60/775

(58) Field of Classification Search ................ 123/204, 123/249; 60/39.63, 39.53, 39.59, 39.3, 775
See application file for complete search history.

(56) References Cited

U.S. PATENT DOCUMENTS 2,808,813 A * 10/1957 Lindhagen et al. ......... 123/204
4,825,827 A * 5/1989 Yang .......................... 123/249
6,336,317 B1 * 1/2002 Holtzapple et al. ........ 60/39.63

* cited by examiner

*Primary Examiner*—Thai-Ba Trieu

(57) ABSTRACT

An engine is disclosed. This invention is a multi-fuel oil-free engine for surface vehicles. With only one cycle and two fluids, air in an open cycle and water in a closed cycle, these fluids mixed with each other, one superimposing upon and augmenting the performance of the other. This engine can substitute advantageously the piston engines in an automobile and augmenting the mileage three times with equal energy consumption.

1 Claim, 3 Drawing Sheets

INTERNAL COMBUSTION ENGINE OF OPEN-CLOSET CYCLE AND BINARY FLUID

This application claims benefits of the provisional application No. 60/482,882 filing date Jun. 27, 2003 CONFIRMATION NO. 5004.

CROSS-REFERENCE TO RELATED APPLICATIONS

An internal combustion engine of open closed cycle and binary fluid with the principal mechanical parts driven by gyratory screws with external synchronized timing gears, characterized by a compression of air cooled by water with air flow and pressure modulation, regenerative air heating, gases heating for continuous combustion, gases dry expansion from a constant maximum temperature, gases and steam superheated re-heated by continuous combustion, gas and steam superheated dry expansion from a constant maximum temperature, and exhaust gases cooling for condensation and water recovery.

The invention belongs to the field of the internal combustion engine for surface vehicles and electrical generators.

BACKGROUND OF THE INVENTION

The piston engine, dominates the power plant market for cars but it is difficult to redesign a piston engine for stricter air pollution standards, the price of petroleum is crescent, and the good perfomance makes low the engine efficiency at car legal speed.

The invention is the result of a research to solve these problems.

The invention, with a similar original cost to the car piston engine, is more efficient than any other known combustion engine, a passenger car can make more than 90 mpg in urban streets or in a highway at 60 mph.

The invention can use any commercial fuel fluid, especially compressed natural gas.

The invention is cleaner than any other known combustion engine, oil-free, it uses a catalityc converter and it produces undefiled exhaust emission, it is cooled and cleaned by gas washers and acid control without water consumption.

BRIEF SUMMARY OF THE INVENTION

The invention is an Absolute World Novelty, a new class of positive displacement engine of fast response as the piston engine, and similar to a regenerative combustion turbine of split shaft in speed and appearance.

The cycle of the invention is also an Absolute World Novelty, it is an open cycle for the air and closed for the water with capacity of modulation from 10% to 100% combined with pressure ratio modulation from 4 to 20, with constant maximum temperature of inlet gas to expanders for any speed or load.

DETAILED DESCRIPTION

Figure 2:
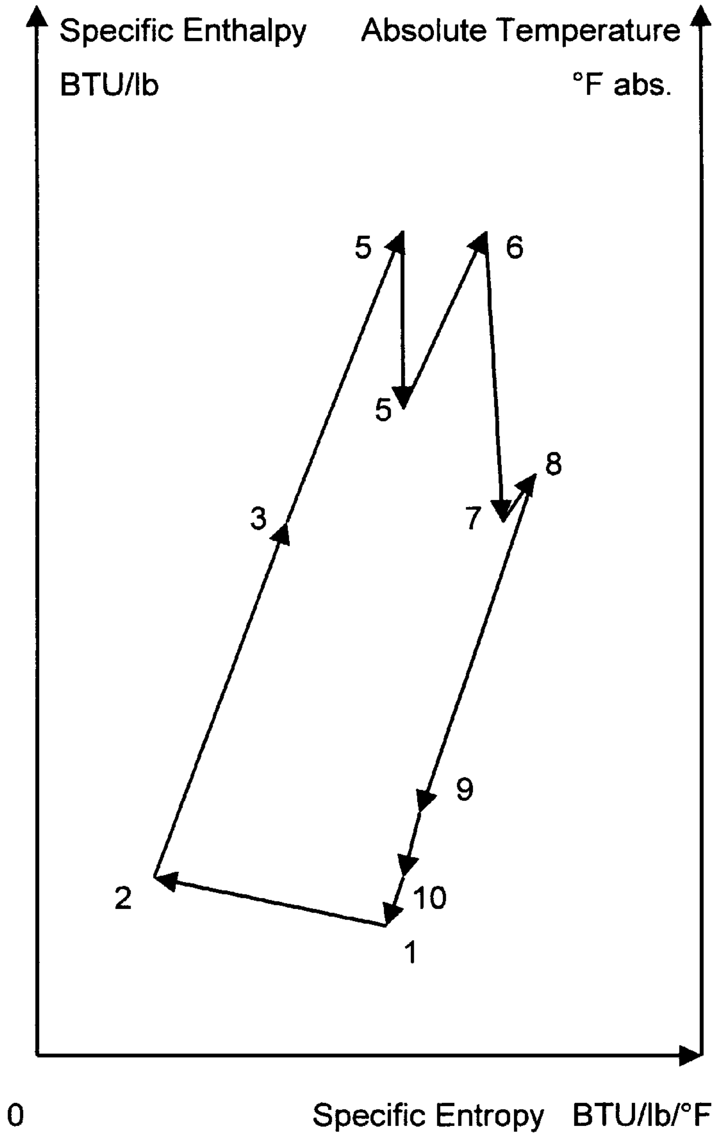
FIG. 2 is a schematic diagram showing the relations of component parts of this invention.
Figure 3:
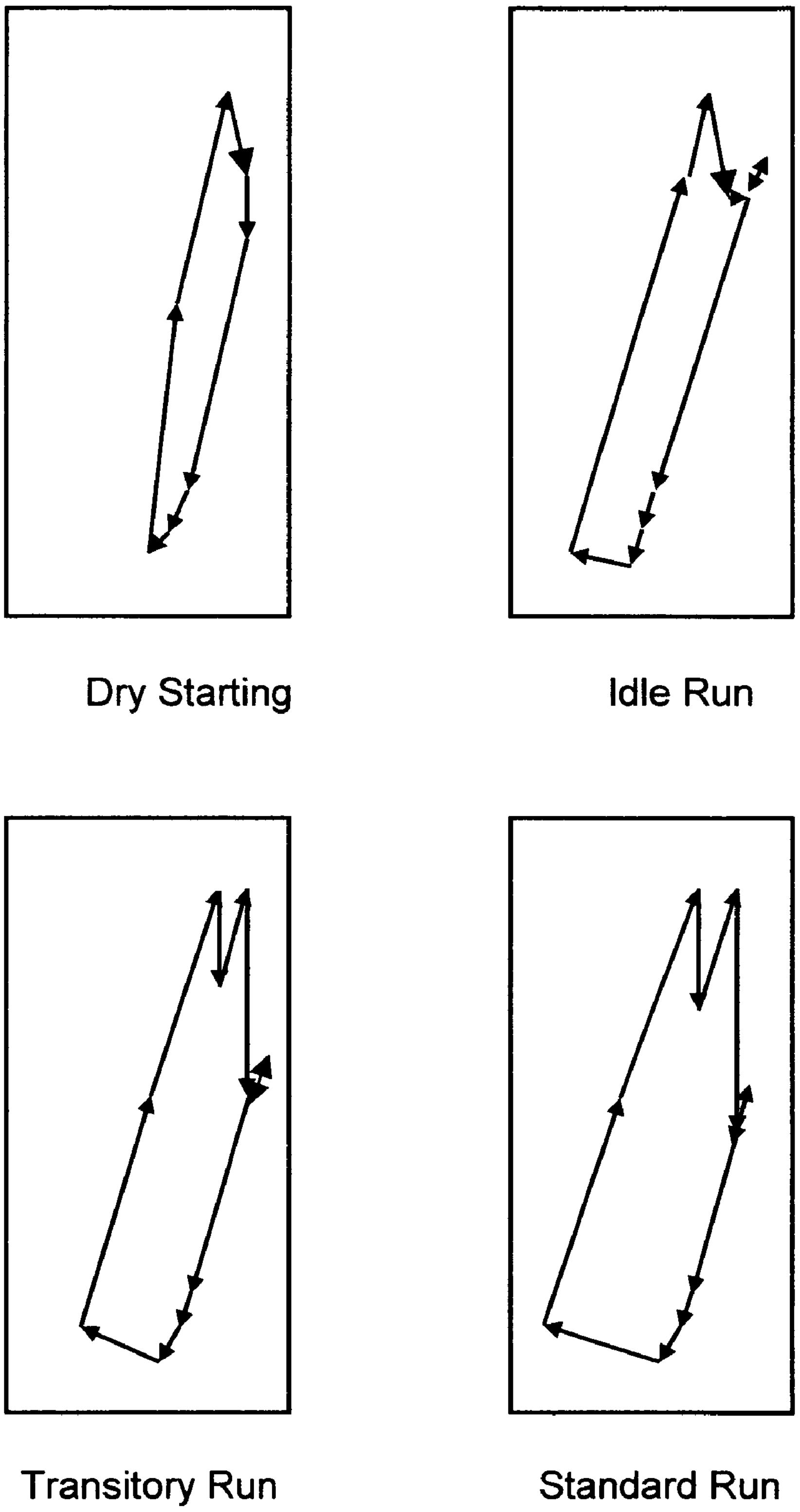
FIG. 3 is the diagram of the thermal cycle for this invention, for dry starting, idle run, standard run and maximum power, the left axis of ordinates is the specific enthalpy, the right axis of ordinates is the absolute temperature, and the axis of abscissas is the specific entropy.

In FIG. 2, the normal thermal cycle of the invention consists of a wet compression, indicated with 1–2, regenerative heating indicated with 2–3, continuous combustion heating indicated with 3–4, dry expansions indicated with 4–5, reheating for continuous combustion heating indicated with 5–6, dry expansion indicated with 6–7, regenerative catalytic heating indicated with 7–8, regenerative cooling indicated with 8–9, cooling for condensation of water vapor indicated with 9–10, and with outlet exhaust gases to state 1.

Figure 1:
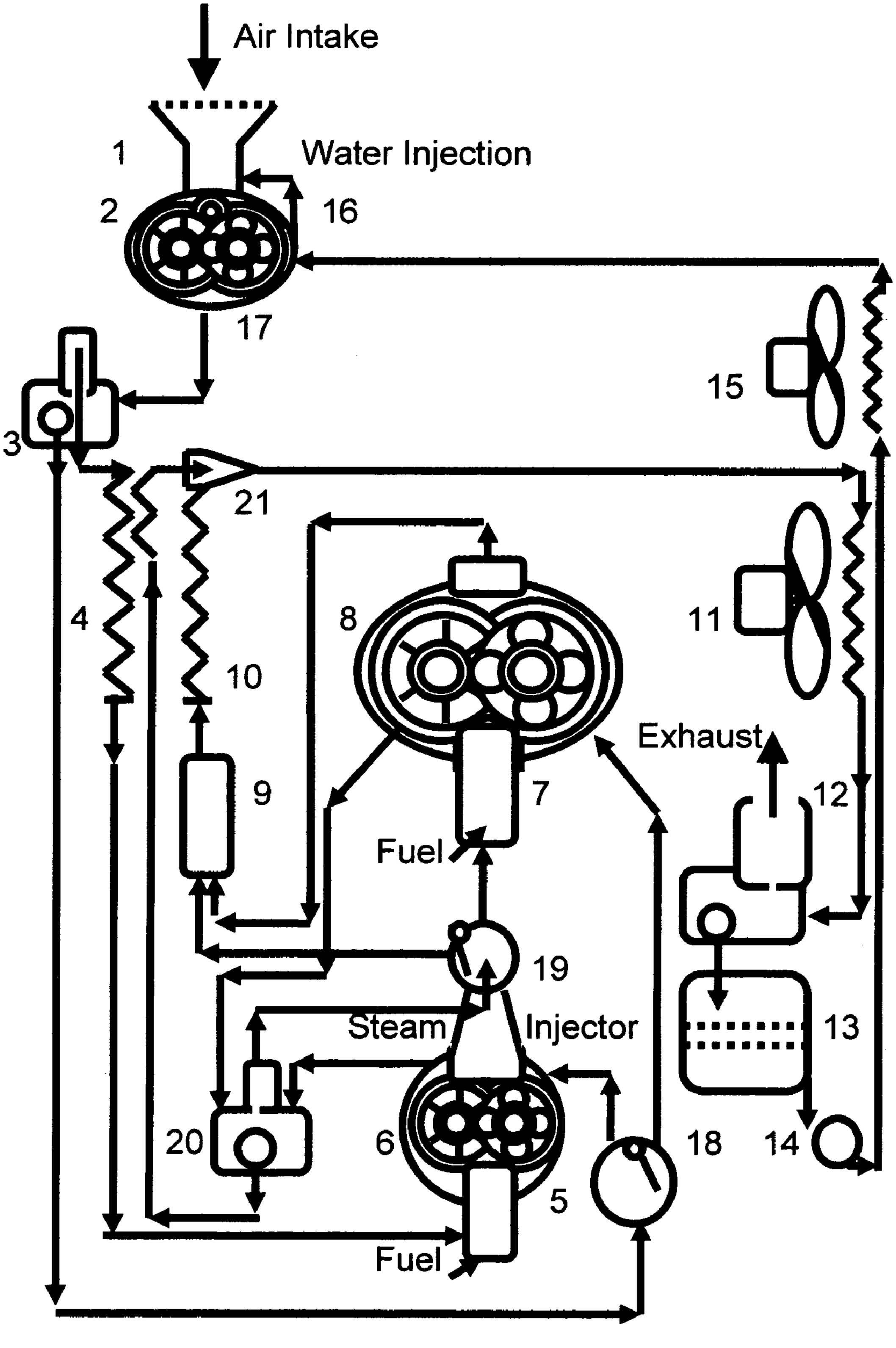
FIG. 1 is the diagram of the normal thermal cycle for this invention, the left axis of ordinates is the specific enthalpy, the right axis of ordinates is the absolute temperature, and the axis of abscissas is the specific entropy.

In FIG. 1, indicated with 1 is the dry air filter, indicated with 2, is the oil-free air compressor, this compressor consists essentially of two helical grooved no contact rotors, a male, the driver, four lobes, and one female, six gullies, in a stationary housing with suitable inlet and outlet ports, with water injector and combined sliding valve for capacity modulation from 10% to 100% and pressure ratio modulation from 4 to 20, indicated with 3 is the high pressure water separator; in FIG. 1 indicated with 4 the high pressure side of the regenerator, is a heat exchanger that heats the air compressed before combustion with heat rejected by the cycle; indicated with 5, is the first combustor in which the fuel is burned with primary air and the hot gas is diluted with secondary air for a homogeneous mixture of the outlet gas at constant temperature of 2,500° F., indicated with 6 is the first stage expander, it is a gyratory screws machine without contact between screws or housing and screws, this expander drives only the compressor and the accessories, the hot gas escaping in the first expander is recuperated by the second expander, the outlet gas from the first expander indicated with 6, that goes to the second combustor indicated with 7 or to the catalyzer indicated with 9, by means of a damper indicated with 19, in principle the part at high temperature use a stainless steel alloy of iron-cobalt-nickel with coating of alloy of chromium-aluminium-ytrio, the internal cooling is by water at head pressure for bearing and gears box, and by water vaporization in rotors and housing; the second combustor indicated with 7 has steam injection generated by the internal cooling, for inlet run the fuel injection is cut, the pressure ratio is reduced at minimum, and the damper indicated with 19 is closed, in normal run the outlet gas of the second combustor indicated with 7 is of constant temperature, 2,500° F.; indicated with 8 is the second stage expander which drives the outpower shaft, the escaping of hot gas in second expander is recupered by the regenerator; indicated with 9 is a typical catalytic converter for regenerative combustion turbine; indicated with 10 is the low pressure side regenerator; indicated with 11 is an air cooled condenser that recuperated water from water injector and generated by combustion, indicated with 12 is the low pressure water separator; indicated with 13 is the water tank insulated with automatic heater for low temperatures, water filter for the solid removal and to neutralize oxides and acid of sulphur; indicated with 14 is the water pump for the compressor indicated with 2; indicated with 15 is the air cooled for the water compressor indicated with 2; indicated with 16 is the water injector with the water outlet from cooling of gears, seals, anti-friction ball and roller bearings of compressor indicated with 2; indicated with 17 is the water and air outlet from compressor indicated with 2 to separator indicated with 3; indicated with 18 is the water control for cooling of expander indicated with 6 and the expander indicated with 8; indicated with 19 is the damper valve for idle run; indicated with 20 is a steam separator; indicated with 21 is a water ejector for exhaust gas aspiration from the low pressure side of the regenerator indicated with 10.

I claim:

1. An internal combustion engine of open closed cycle and binary fluid comprising:

a dry air filter cleaning aspired atmospheric air;

a water injector twin screw compressor that compresses air and pumps water, oil-free, in a single stage, with air flow from 10 percent up to 100 percent, air pressure ratio from 4:1 up to 20:1;

a high-pressure water separator to remove the water at high pressure from the compressed air;

a high-pressure side regenerator, for recuperative heating of the compressed air;

a first combustor to burn different types of liquid or gaseous fuels for heating the preheated compressed air in a continuous combustion;

a first twin screw expander with fixed expansion ratio for a first expansion stage of hot gasses from the first combustor at constant maximum peak temperature, the first twin screw expander drives the compressor;

a damper valve regulating the amount of hot gasses being delivered into the second combustion chamber, and bypassing the hot gasses to a regenerative catalytic reactor;

a second combustor burning different types of liquid or gaseous fuels for reheating the hot gasses and steam injected in a continuous combustion, the fuel injected in the second combustor and the steam injected are cut off simultaneously in idle run;

a second twin screw expander with fixed expansion ratio for a second expansion stage of hot gasses and steam from the second combustor at constant maximum peak temperature, this second twin screw expander has an output power shaft;

a regenerative catalytic converter and thermal reactor recovering heat increasing the temperature of exhaust gasses by means of the post combustion of hydrocarbon and carbon monoxide and reducing the nitrogen oxides;

a low-pressure regenerator, wherein the hot exhaust gasses is cooled and the water vapor is condensed;

a steam separator wherein the high-pressure steam coming out of the first and second twin screw expanders is injected;

a water ejector combining a high-pressure fluid with a low-pressure fluid to form an intermediate-pressure fluid supply;

a condenser, recovering water from the exhaust gasses and steam;

a low-pressure water separator, wherein the injected water and the water are generated by combustion is removed from the exhaust gasses, and then the exhaust gasses are discharged right to the atmosphere;

an insulated water tank having a filter for the solid removal and to neutralize oxides, acid and sulfur dioxide;

a water pump transferring water from the insulate water tank to a cooler, the water being supplied through a water injector to cool down the water-injection twin compressor;

a water control controlling water flow from the high-pressure water separator being supplied to the first twin-screw expander and the second twin-screw expander; and a steam injector in the damper valve controlling hot gasses to be delivered to the second twin-screw expander.

* * * * *